United States Patent [19]

Donigan et al.

[11] 4,198,671
[45] Apr. 15, 1980

[54] CAPACITOR ASSEMBLY

[76] Inventors: Carolyn L. Donigan, 685 Hickory Heights Dr.; Deane B. MacMillan, 4243 Sunningdale, both of Bloomfield Hills, Mich. 48013; James H. Srock, 624 W. Lincoln, Birmingham, Mich. 48009

[21] Appl. No.: 912,557

[22] Filed: Jun. 5, 1978

[51] Int. Cl.² .............................................. H01G 1/14
[52] U.S. Cl. ..................................... 361/306; 361/272
[58] Field of Search ............................... 361/306, 272; 174/52 PE; 264/272; 29/25.42

[56] References Cited

U.S. PATENT DOCUMENTS

| | | | |
|---|---|---|---|
| 1,900,352 | 3/1933 | Lewis | 361/306 X |
| 2,373,601 | 4/1945 | Robinson | 361/306 X |
| 2,737,618 | 3/1956 | Eisler | 174/52 PE X |
| 3,086,149 | 4/1963 | Baron | 174/52 PE Z |
| 3,818,288 | 6/1974 | Wenzl | 361/272 |
| 3,986,084 | 10/1976 | Carter | 361/306 |

FOREIGN PATENT DOCUMENTS

| | | | |
|---|---|---|---|
| 154248 | 11/1953 | Australia | 361/306 |
| 1092571 | 4/1955 | France | 361/306 |
| 872521 | 7/1961 | United Kingdom | 264/272 |

Primary Examiner—E. A. Goldberg
Attorney, Agent, or Firm—Krass & Young

[57] ABSTRACT

A capacitor assembly in which a capacitor is encapsulated by a molding process, with the encapsulation providing a structural securement of the electrical terminals and/or mounting brackets to the capacitor windings, as well as affording a complete sealing of the capacitor assembly. The molding process is carried out after assembly of the components into a cradle or housing which temporarily maintains the electrical terminals and mounting bracket in contact with the capacitor windings. Upon placement of the assembly into an injection mold and closing of the mold, the various components are forced into tight contact by the injection molding process. Upon solidication of the encapsulation material, the various parts are thereby secured together.

3 Claims, 6 Drawing Figures

CAPACITOR ASSEMBLY

BACKGROUND DISCUSSION

This invention concerns capacitors of the type comprising wound layers of dielectric material alternating with electrically conductive layers and also methods of manufacturing capacitor assemblies including a capacitor and electrical terminals as well as housing and mounting brackets therefor.

Such capacitor assemblies have typically included a housing in order to protect the capacitor itself from degradation due to environmental conditions and from simple mechanical abuse.

In addition, the housing is also commonly provided with a mounting bracket to allow the securement of the capacitor to the mounting structure. Finally, the necessary electrical terminals or connections to the capacitor windings are included in such assembly.

In many designs, the housing is provided by a metal casing in which is disposed the wound capacitor. The metal casing provides a ground contact for the capacitor by contact with the capacitor windings, and a flexible lead in electrical contact with the other side of the windings.

The mounting bracket is welded or otherwise secured to the metal housing in order to seal the cylinder at the point whereat the flexible lead emerges and a washer and sealing medium is employed.

The use of a relatively complex assembly adds substantially to the cost of manufacture of the component and the use of the metal housing creates the possibility of corrosion failure as well as grounding of adjacent electrical circuits.

Encapsulation has heretofore been proposed and implemented for other capacitor types, such as the design for a through contact capacitor, disclosed in U.S. Pat. No. 3,986,084.

Accordingly, it is an object of the present invention to provide a capacitor assembly of the type including a capacitor housing and end-mounted electrical terminals which may also include a grounding terminal mounting bracket in which the steps required to carry out its manufacture are substantially simplified.

It is yet another object of the present invention to provide such a capacitor assembly in which the various components are sealed and supported in the proper relationship by a nonmetallic enclosure.

SUMMARY OF THE INVENTION

These and other objects of the present invention, which will become apparent upon a reading of the following specification and claims, are accomplished by an encapsulation of the various components which encapsulation provides the structural support for maintaining the various components in their proper relationship. This encapsulation is carried out by a molding process in which the capacitor and the electrical terminal contacts and/or mounting brackets may be secured in intimate relationship with each other to insure good electrical contact prior to being placed in a mold by assembly into a cradle or housing element, such that these components are maintained in secure contact with each other during the molding process. In the case of an injection molding process, the mold sections exert a pressure to force the components into tight contact to provide a very secure mounting of the components upon solidification of the encapsulation material.

DETAILED DESCRIPTION

In the following detailed description, certain specific terminology will be utilized for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
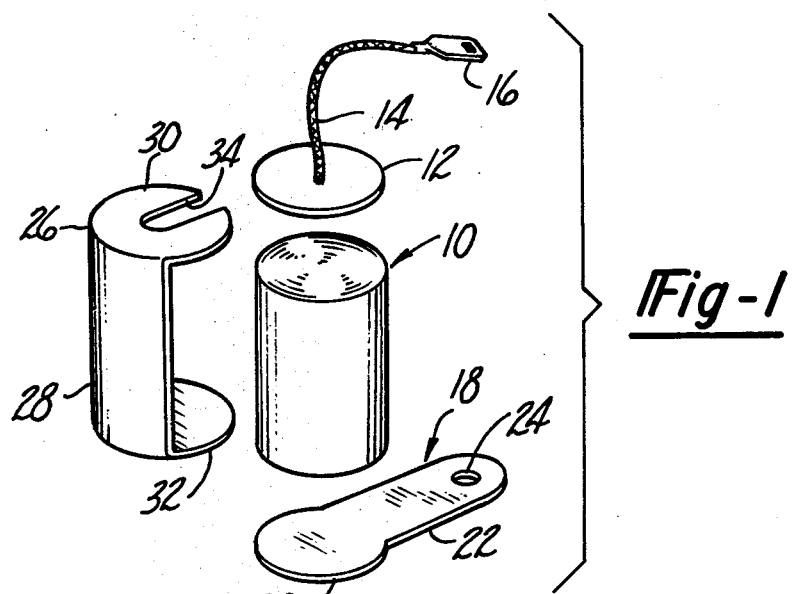
FIG. 1 is an exploded perspective view of the various components of the capacitor assembly prior to encapsulation.

Referring to the drawings and particularly to FIG. 1, the capacitor assembly components prior to encapsulation include the wound capacitor 10 which may be of a conventional wound construction in which alternating layers of dielectric material and electrically conductive material are spirally wound into the cylindrical structure shown in FIG. 1. Such material as a thin Mylar (TM) plastic and aluminum foil conductive material are commonly employed. Inasmuch as the capacitor itself may be of conventional construction and the constructional details and the method of manufacture thereof are well known to those skilled in the art, the same are not here included.

In order to provide a proper electrical connection on either side of offset windings to produce a capacitance in the circuit in which wound capacitor 10 is connected, electrical contacts are provided. A disc contact 12 is shown in FIG. 1 which includes a disc of a conductive material such as brass having an extended lead 14 affixed thereto with an end terminal 16 for connection into the electrical circuit. The disc contact 12 is adapted to be placed in contact against one end face of the wound capacitor 10 and is thereby placed in electrical contact with one set of the windings.

The opposite end face of the wound capacitor 10 is adapted to be contacted by a combination ground lead and mounting bracket 18, comprised of a rigid flat metal section having a partially circular contact 20 adapted to mate with the opposite end face of the wound capacitor 10.

The combination ground lead and mounting bracket 18 includes an elongated intermediate section 22 with a mounting hole 24 formed in the end. The combination ground lead and mounting bracket 18 extends radially from the wound capacitor 10 with the contact 20 placed in position against the end face of wound capacitor 10.

The disc contact 12 and the combination ground lead and mounting bracket 18 are assembled in position on their respective end faces of the wound capacitor 10 and secured in position in tight engagement with the cylindrical end faces by the use of a cradle 26 which may be formed of a suitable molded plastic compatible with the encapsulation material.

The cradle 26 includes a partially cylindrical body section 28 with a pair of end faces 30 and 32 axially displaced from each other a distance corresponding to the distance between the disc contact 12 and the combination ground lead and mounting bracket 18 when placed in position on the wound capacitor 10.

The end face 30 is slotted at 34 to accommodate the lead 14 of the disc contact 12. The cradle 26 is thus suitably dimensioned to provide a tight securement together of these elements.

Figure 2:
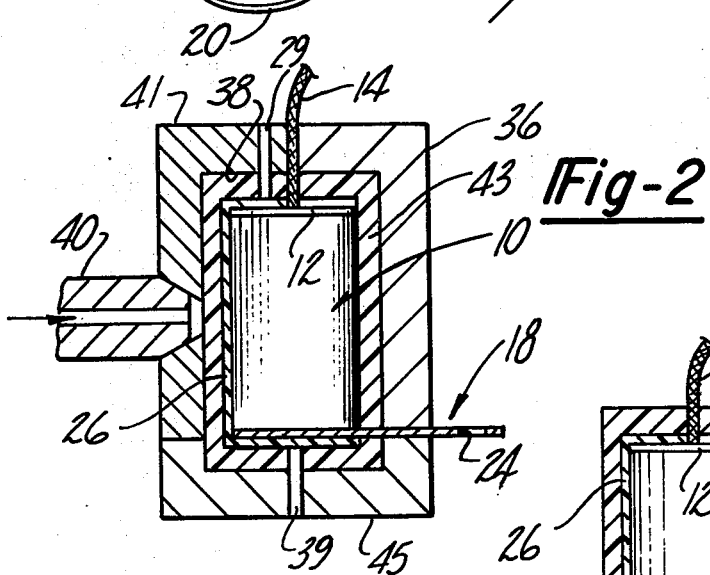
FIG. 2 depicts the capacitor assembly in position within a mold cavity with the encapsulating material injected about the assembly.

After assembly of these components together, the entire assembly is placed into a mold 36 having a mold cavity 38 as depicted in FIG. 2, configured to receive the assembly with a clearance thereabout of a suitable length to provide an encapsulation of the assembly which has sufficient structural integrity to maintain tight engagement of the components. Pressure pins 39 may be secured to the mold sections 41 and 45 such that upon assembly of the mold sections 41 and 45, the contacts 12 and 20 are forced into tighter contact.

The combination ground lead and mounting bracket 18 extends from the mold, as well as the lead 14 through appropriately located parting lines. An injection nozzle 40 injects a suitable flowable plastic material into the clearance space between the assembly and the interior walls of the mold cavity 38 to thus provide a complete encapsulation of the assembly.

The encapsulation material should be selected such that the temperatures experienced by the wound capacitor 10 during the molding process are such as not to damage the capacitor materials employed. Suitable plastic materials include a Kraton (TM) plastic, or polyethylene plastic, both of which have suitable strength characteristics while being thermoplastically moldable at sufficiently low temperatures to insure that the wound capacitor 10 will not be damaged during the molding process. Many other encapsulating materials having suitable molding and strength characteristics of course could be employed as long as compatible with the construction of the molding process with the materials and construction of the other components in the capacitor assembly.

The use of an injection molding process provides the additional advantage in that the material may be injected so as to exert pressure tending to augment the force of the pressure pins, forcing the components into tighter engagement. This approach corrects any tendency for the molding process to dislodge the parts, i.e., if the parts are allowed to be loosely assembled to each other, the molding process may lead to mispositioning of the parts and loss of the electrical contact.

Thus, upon cooling of the encapsulating materials and solidification and removal from the mold, the terminals are very tightly secured in proper mating contact relationship.

Figure 3:
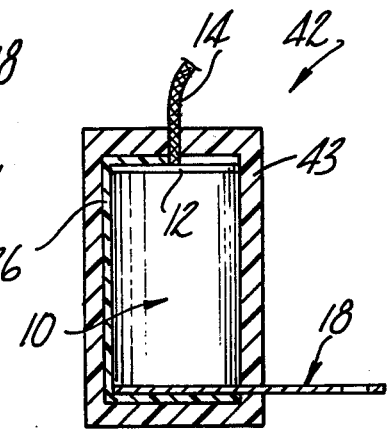
FIG. 3 depicts the capacitor assembly according to the present invention after being removed from the mold depicted in FIG. 2.

The resultant capacitor assembly 42 (FIG. 3) exhibits the characteristics sought to be achieved in the above-described objects of the present invention. That is, the encapsulation layer 43 provides at once the total sealing of these components from the exterior environment and the structural support for the various components to maintain them in proper physical relationship with each other. This has been provided by a relatively simple manufacturing process which involves only two steps, i.e., the assembly of the components together and the one-step molding process to thus reduce manufacturing costs considerably over conventional construction, while also providing a capacitor assembly of a superior design in that the metal housing has been eliminated and a well-sealed protective environment for the components provided.

Figure 4:
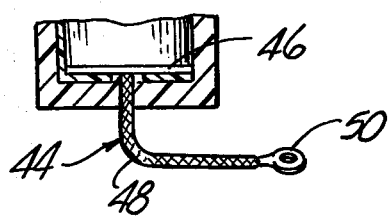
FIG. 4 depicts an alternate configuration of the grounding lead.

According to FIG. 4, the combination ground lead and mounting bracket 18 may be replaced by a flexible lead ground 44 where the use of a mounting bracket is not required. In this case, an end disc 46 is provided similar to the disc contact 12 depicted in FIGS. 1 through 3.

The flexible lead 48 is provided having an end connection 50.

Figure 5:
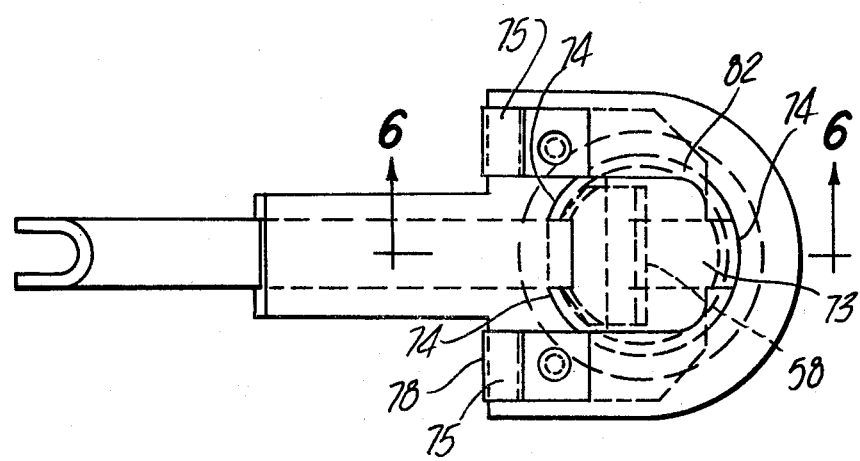
FIG. 5 is a plan view of an alternate capacitor assembly configuration according to the present invention.
Figure 6:
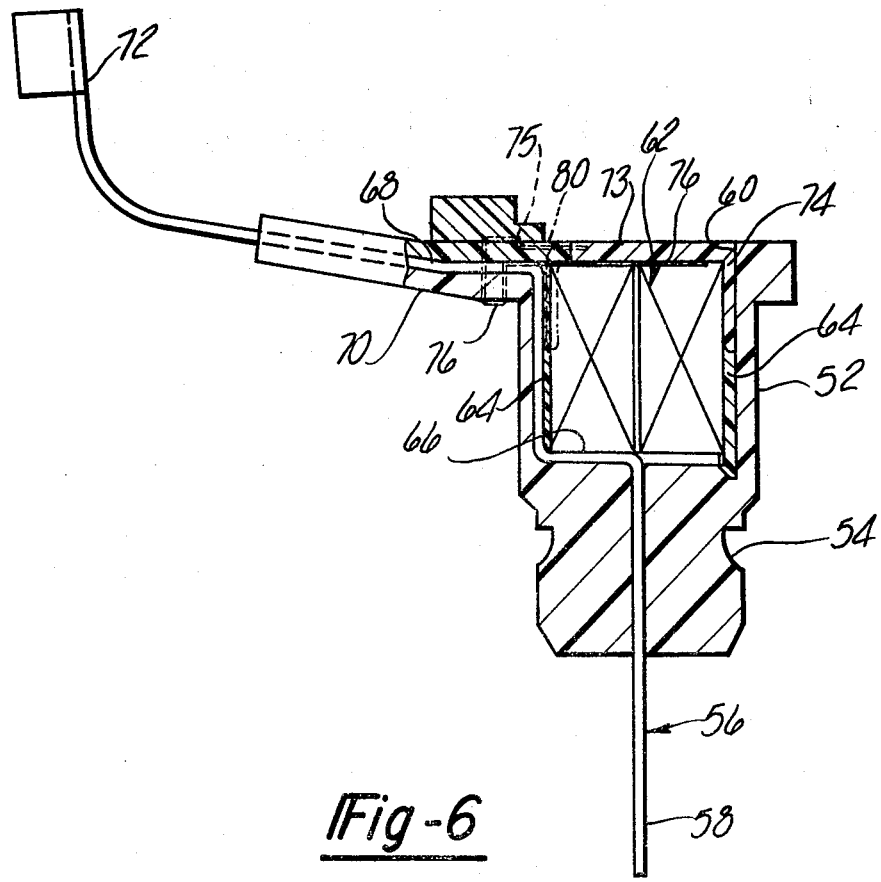
FIG. 6 is a sectional view of the capacitor assembly shown in FIG. 5 taken along the line 5—5.

Referring to FIGS. 5 and 6, an alternate embodiment of the invention is depicted in which the capacitor and electrical contacts are assembled into a housing prior to encapsulation rather than into a cradle element. In this embodiment, the preformed housing 52 has an end portion 54 shaped to mate with a mounting socket. The connector strap 56 for one end of the capacitor windings is formed with an insert prong 58, protruding through the end portion 54 of the housing 52. The prong 58 is adapted to be inserted in a corresponding seat (not shown) to establish electrical contact.

The housing 52 is formed with a bore 60 sized to receive the wound capacitor 62, with a clearance space 64 thereabout which receives the encapsulation material. The wound capacitor 62 is placed in position on top of a contact section 66 of the connector strap 56 which extends upwardly and is disposed within an axially aligned slot formed within the housing 52 and which has a step section 68 which extends upwardly to a similar slot formed in a support extension 70 of the housing 52.

The end section 72 of the connector strap 56 is adapted to be connected into the electrical circuit.

Thus, the contact section 66 is in abutment with the end face of the wound capacitor 62 windings as in the above-described embodiment.

Prior to molding of the encapsulation material, in order to insure proper location of the wound capacitor 62 in the bore 60, a spacer element 73 is provided having fingers 74 circumferentially spaced and extending into the clearance space 64. The spacer element 73 is formed of plastic or other electrically insulative material compatible with the encapsulation material.

A grounding lead is provided by a metal foil layer 76 which extends over the opposite end face of the wound capacitor 62, which foil layer 76 has a pair of leg sections 75 which extend out of the housing 52 and are wrapped around end sections 78 back onto the top surface above the encapsulation material and are staked by being positioned over plastic protrusions formed on the housing 52 molding and which may be heat flattened to seal the foil as indicated at 80 in FIG. 6.

The encapsulation material is molded into the clearance space 64 and intermediate the bore 60 and spacer element 73 over the top of the step section 68 of the connector strap 56. This molding may be carried out by assembly into a mold in similar fashion to the above-described embodiment in which pressure may be exerted on the end face of the spacer element 73 such that upon solidification of the encapsulation material, the electrical contact between the foil layer 76 and the contact section 66 of the connector strap 56 is secured in similar fashion.

Alternatively to these described embodiments, assembly could be carried out without the use of either a cradle or housing since the parts may be assembled in a mold with proper fixturing features thereof with the encapsulation providing the means for providing structural support for the components in the proper mating relationship.

As an alternative to the embodiment shown in FIGS. 5 and 6, the encapsulation material may also be molded into a suitable configuration for particular application such as to mate with a socket structure for mounting the capacitor assembly.

The embodiments of the invention in which an exclusive property or privilege is claimed are defined as follows:

1. An encapsulated capacitor comprising:
    a capacitor housing having a bore formed extending into said housing and terminating in an endwall and formed with a slot extending out through said endwall;
    a metal connector strap having a section extending along said bore to said endwall and having an end section extending away from said housing from said bore, a contact section extending across said endwall, and a prong extending and protruding through said slot formed in said housing;
    an offset turn wound capacitor disposed in said bore with one end face in contact with said contact section of said connector strap, said capacitor being sized to leave a clearance space between said bore and the outside diameter of said capacitor;
    a grounding lead comprised of a metal layer having a portion extending across the other end face of said capacitor and having a section having spaced leg sections formed thereon extending on either side of said end section of said connector straps away from said end face;
    a spacer having spaced fingers extending into and occupying said clearance space and also having a portion overlying said ground lead portion in contact with said other end face of said capacitor;
    encapsulating material molded into said clearance space and over the top of said capacitor securing said grounding strip and connector strap in position.

2. The encapsulated capacitor according to claim 1 wherein said ground lead comprises a metal foil and wherein said leg portions include terminal portions extending over the top of said encapsulating material and staked thereto.

3. The encapsulated capacitor according to claim 1 wherein said housing is formed with a support extension extending from said housing and underlying said end section, and wherein encapsulating material overlies said support extension and said end section.

* * * * *